(12) United States Patent
Sekiguchi

(10) Patent No.: US 8,347,069 B2
(45) Date of Patent: Jan. 1, 2013

(54) INFORMATION PROCESSING DEVICE, INFORMATION PROCESSING METHOD AND COMPUTER READABLE MEDIUM FOR DETERMINING A PROCESSING SEQUENCE OF PROCESSING ELEMENTS

(75) Inventor: Yumi Sekiguchi, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 739 days.

(21) Appl. No.: 12/555,384

(22) Filed: Sep. 8, 2009

(65) Prior Publication Data

US 2010/0223450 A1 Sep. 2, 2010

(30) Foreign Application Priority Data

Feb. 27, 2009 (JP) ................................ 2009-045912

(51) Int. Cl.
G06F 7/38 (2006.01)
G06F 9/00 (2006.01)
G06F 9/44 (2006.01)
G06F 15/00 (2006.01)

(52) U.S. Cl. ....................................................... 712/245

(58) Field of Classification Search ................ None
See application file for complete search history.

(56) References Cited

U.S. PATENT DOCUMENTS

| 5,436,734 A | 7/1995 | Yamauchi et al. |
| 6,061,749 A * | 5/2000 | Webb et al. ...................... 710/65 |
| 6,507,898 B1 * | 1/2003 | Gibson et al. ................. 711/168 |
| 6,674,536 B2 * | 1/2004 | Long et al. ................... 358/1.15 |

FOREIGN PATENT DOCUMENTS

JP 2903917 B2 3/1999

* cited by examiner

*Primary Examiner* — Corey S Faherty
(74) *Attorney, Agent, or Firm* — Sughrue Mion, PLLC

(57) ABSTRACT

A storage part stores correspondence information on incorporation or change in processing sequence of processing elements. An acquiring part acquires a target processing element group. An extracting part extracts the correspondence information on the processing elements included in the target processing element group. An incorporation determining part determines a set of processing elements to be incorporated in the target processing element group on the basis of the information on the incorporation of the correspondence information. An updating part updates the processing elements included in the target processing element group and the correspondence information of the processing elements included in the target processing element group based on the set of processing elements. A processing sequence determining part determines the processing sequence of the processing elements included in the target processing element group updated on the basis of the information on the change in processing sequence in the correspondence information updated.

9 Claims, 10 Drawing Sheets

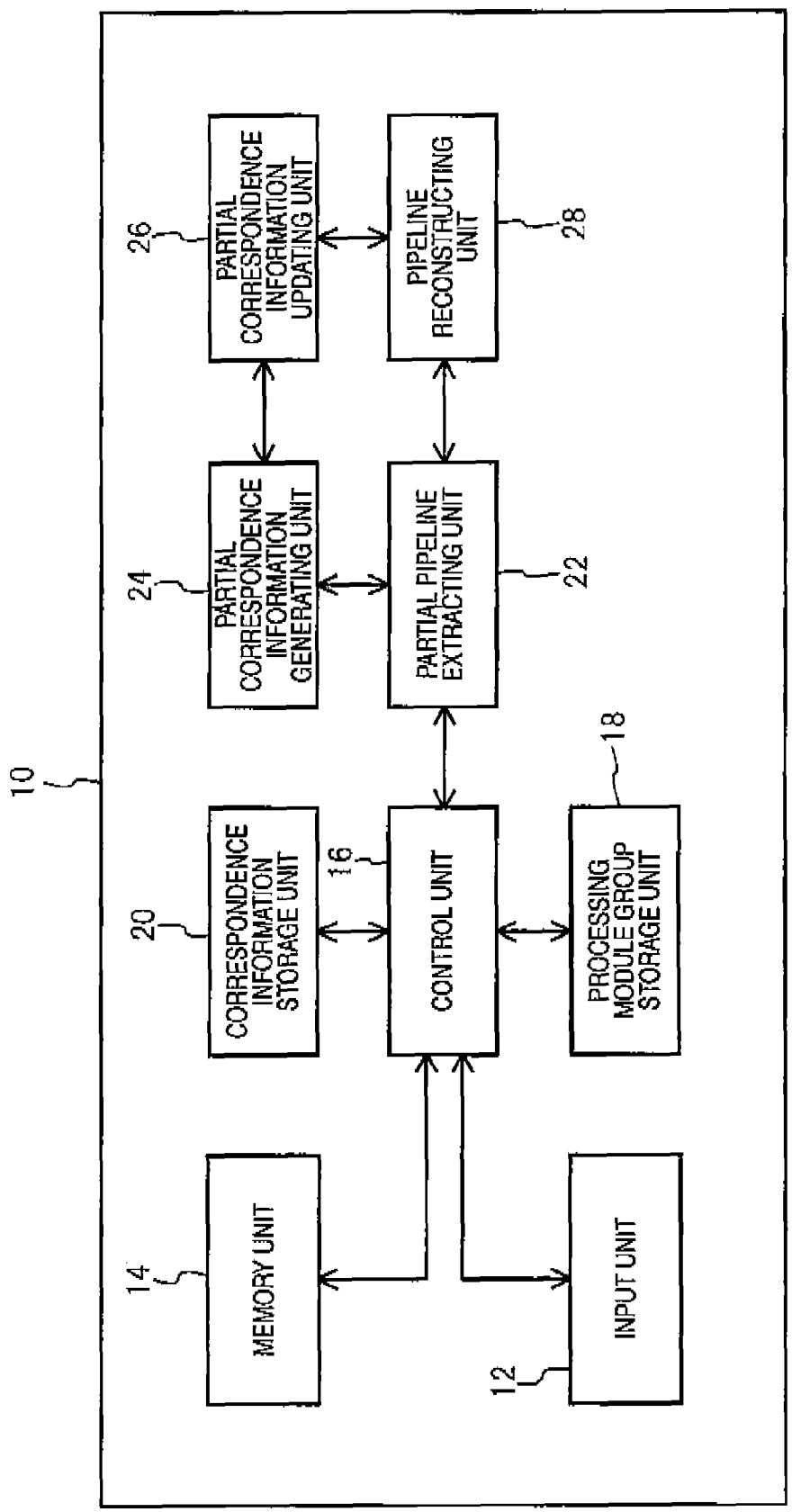

| PROCESSING MODULE | DETAILS |
|---|---|
| M1 | Crop |
| M2 | Append Margin |
| M3 | Adjust Size |
| M4 | Binarization(TH) |
| M5 | Binarization(ED1) |
| M6 | Binarization(ED2) |
| M7 | Binarization(Dither60) |
| M8 | Convert 1 to 8 |
| M9 | Apply Palette |
| M10 | Color Space |
| M11 | Not |
| M12 | Reverse Channel |
| M13 | Select Channel |
| M14 | Rotate 90 |
| M15 | Affine(NN) |
| M16 | Affine(LI) |
| M17 | Affine(CC) |
| M18 | Mirror X |
| M19 | Mirror Y |
| M20 | Scale(NN) |
| M21 | Scale(LI) |
| M22 | Scale(CC) |
| M23 | Scale(BS) |
| M24 | Scale(PP) |
| M25 | Scale(OR) |
| M26 | Scale(IAR) |

| VALUE | PROCESSING SPEED IS USED AS CRITERION OF EVALUATION | IMAGE QUALITY IS USED AS CRITERION OF EVALUATION |
|---|---|---|
| −2 | SEQUENCE IS FIXED | SEQUENCE IS FIXED |
| −1 | SLOW | BAD |
| 0 | CONSTANT | CONSTANT |
| 1 | FAST | GOOD |
| 2 | DEPENDING ON AMOUNT OF INFORMATION TO BE PROCESSED | – |
| 3 | CAN BE INCORPORATED | CAN BE INCORPORATED |

*FIG. 4*

|    | P1\P2 | A1 | A2 | A3 | A4 | A5 | A6 |
|----|-------|-----|-----|-----|-----|-----|-----|
|    |       | M20 | M11 | M10 | M11 | M20 | M18 |
| A1 | M20   |     | 2   | 2   | 2   | 3   | 2   |
| A2 | M11   | 2   |     | -2  | 3   | 2   | 0   |
| A3 | M10   | 2   | -2  |     | -2  | 2   | 2   |
| A4 | M11   | 2   | 3   | -2  |     | 2   | 0   |
| A5 | M20   | 3   | 2   | 2   | 2   |     | 2   |
| A6 | M18   | 2   | 0   | 2   | 0   | 2   |     |

FIG. 5

| P1 \ P2 | A1 M20 | A2 M11 | A3 M10 | A4 M11 | A5 M20 | A6 M18 |
|---|---|---|---|---|---|---|
| A1 M20 | | 1 | 1 | 1 | 3 | 1 |
| A2 M11 | -1 | | -2 | 3 | 1 | 0 |
| A3 M10 | -1 | -2 | | -2 | 1 | 0 |
| A4 M11 | -1 | 3 | -2 | | 1 | 0 |
| A5 M20 | 3 | -1 | -1 | -1 | | -1 |
| A6 M18 | -1 | 0 | 0 | 0 | 1 | |

| P1\P2 | A1 M20 | A2 M11 | A3 M10 | A4 M11 | A5 M20 | A6 M18 |
|---|---|---|---|---|---|---|
| A1 M20 |  | 1 | 1 | 1 | 3 | 1 |
| A2 M11 | -1 |  | -2 | 3 | 1 | 0 |
| A3 M10 | -1 | -2 |  | -2 | 1 | 0 |
| A4 M11 | -1 | 3 | -2 |  | 1 | 0 |
| A5 M20 | 3 | -1 | -1 | -1 |  | -1 |
| A6 M18 | -1 | 0 | 0 | 0 | 1 |  |

(b)

| P1 | P2 |
|---|---|

| A2 | M11 |
| A3 | M10 |
| A4 | M11 |
| A5 | M20 |
| A6 | M18 |

|  | A2 M11 | A3 M10 | A4 M11 | A5 M20 | A6 M18 |
|---|---|---|---|---|---|
|  |  | -2 | 3 | 1 | 0 |
|  | -2 |  | -2 | 1 | 0 |
|  | 3 | -2 |  | 1 | 0 |
|  | -1 | -1 | -1 |  | -1 |
|  | 0 | 0 | 0 | 1 |  |

(c)

| P1\P2 | A2 M11 | A3 M10 | A4 M11 | A5' M20 | A6 M18 |
|---|---|---|---|---|---|
| A2 M11 |  | -2 | 3 | 1 | 0 |
| A3 M10 | -2 |  | -2 | 1 | 0 |
| A4 M11 | 3 | -2 |  | 1 | 0 |
| A5' M20 | -1 | -1 | -1 |  | -1 |
| A6 M18 | 0 | 0 | 0 | 1 |  |

FIG. 7A (a)

| P1 \ P2 | A2 M11 | A3 M10 | A4 M11 | A5' M20 | A6 M18 |
|---|---|---|---|---|---|
| A2 M11 |  | -2 | 3 | 1 | 0 |
| A3 M10 | -2 |  | -2 | 1 | 0 |
| A4 M11 | 3 | -2 |  | 1 | 0 |
| A5' M20 | -1 | -1 | -1 |  | -1 |
| A6 M18 | 0 | 0 | 0 | 1 |  |

⇩

(b)

| P1 \ P2 | A2 M11 | A3 M10 | A4 M11 | A6 M18 | A5' M20 |
|---|---|---|---|---|---|
| A2 M11 |  | -2 | 3 | 0 | 1 |
| A3 M10 | -2 |  | -2 | 0 | 1 |
| A4 M11 | 3 | -2 |  | 0 | 1 |
| A6 M18 | 0 | 0 | 0 |  | 1 |
| A5' M20 | -1 | -1 | -1 | -1 |  |

FIG. 7B (a)

|   | X1 | X2 | X3 | X4 | X5 |
|---|---|---|---|---|---|
| X1 |  |  |  |  |  |
| X2 |  |  | −2 | 1 or 0 |  |
| X3 |  |  |  | 1 or 0 |  |
| X4 |  |  |  |  |  |
| X5 |  |  |  |  |  |

(b)

|   | X1 | X2 | X3 | X4 | X5 |
|---|---|---|---|---|---|
| X1 |  |  |  |  |  |
| X2 |  |  | −2 | −1 |  |
| X3 |  |  |  | 1 |  |
| X4 |  |  |  |  |  |
| X5 |  |  |  |  |  |

US 8,347,069 B2

INFORMATION PROCESSING DEVICE, INFORMATION PROCESSING METHOD AND COMPUTER READABLE MEDIUM FOR DETERMINING A PROCESSING SEQUENCE OF PROCESSING ELEMENTS

CROSS-REFERENCE TO RELATED APPLICATIONS

This application is based on and claims priority under 35 USC 119 from Japanese Patent Application No. 2009-045912 filed Feb. 27, 2009.

BACKGROUND

The present invention relates to an information processing device, an information processing method and a computer readable medium.

SUMMARY

According to an aspect of the invention, there is provided an information processing device including:

a storage part that stores correspondence information on incorporation or change in processing sequence of processing elements of each set, the set including processing elements which can be incorporated or changed in processing sequence out of plural processing elements;

an acquiring part that acquires a target processing element group including plural processing elements;

an extracting part that extracts the correspondence information, stored in the storage part, on the processing elements included in the target processing element group acquired by the acquiring part;

an incorporation determining part that determines a set of processing elements to be incorporated from the processing elements included in the target processing element group on the basis of the information on the incorporation of the correspondence information extracted by the extracting part;

an updating part that updates the processing elements included in the target processing element group and the correspondence information of the processing elements included in the target processing element group on the basis of the set of processing elements determined by the incorporated processing element determining part; and a processing sequence determining part that determines the processing sequence of the processing elements included in the target processing element group updated by the updating part on the basis of the information on the change in processing sequence in the correspondence information updated by the updating part.

BRIEF DESCRIPTION OF THE DRAWINGS

Exemplary embodiments of the invention will be described in detail based on the following figures, wherein:

FIG. 1 is a functional block diagram illustrating the configuration of an information processing device according to an exemplary embodiment of the invention;

Figure 2A:
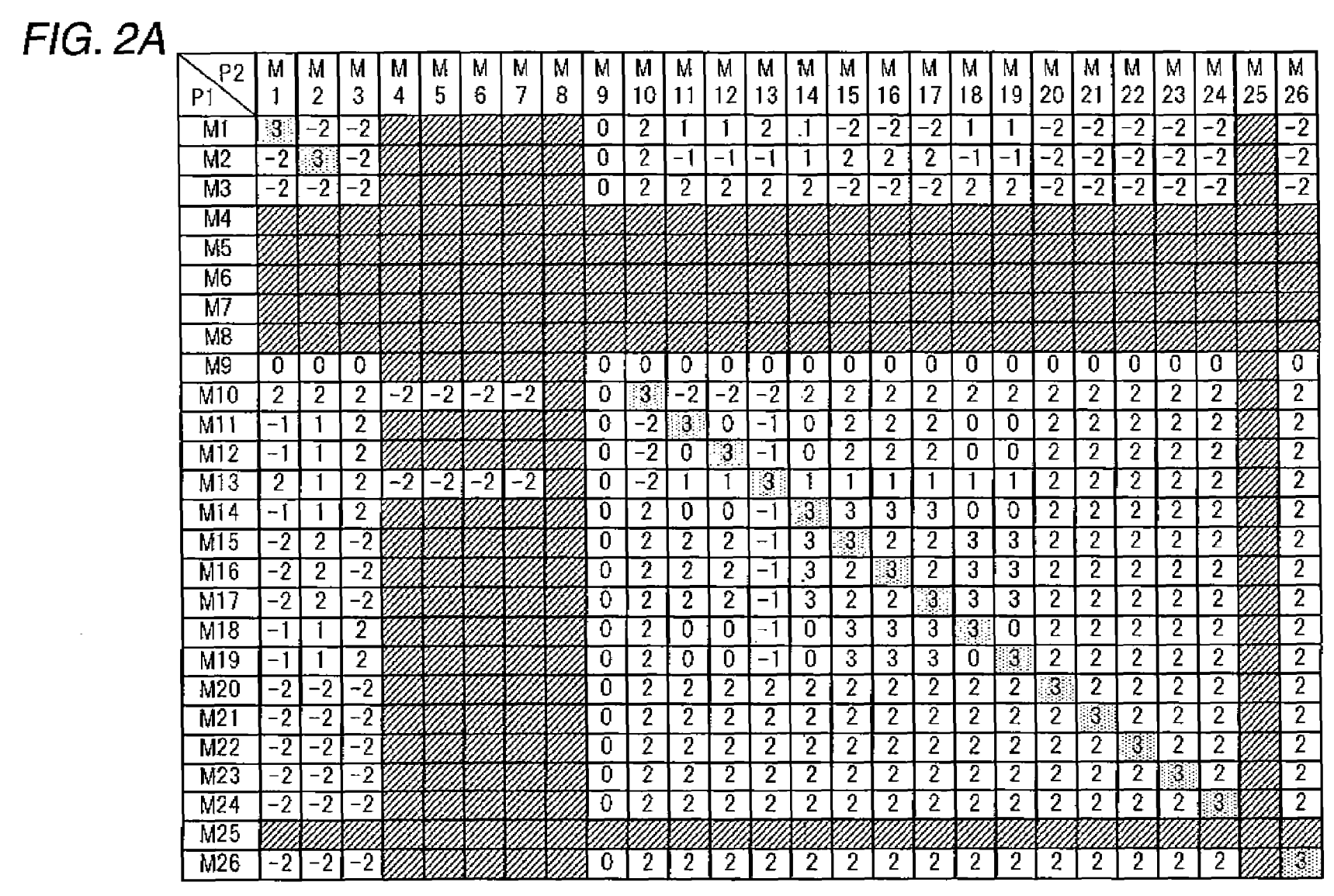

FIG. 2A is a diagram illustrating an example of entire correspondence information;

FIG. 2B is a diagram specifically illustrating details of processing modules M1 to M26;

FIG. 4 is a diagram illustrating an example of a partial correspondence matrix;

FIG. 5 is a diagram illustrating an example of the partial correspondence matrix in which elements of "2" are updated;

FIG. 6 is a diagram specifically illustrating a processing module incorporating process;

FIG. 7A is a diagram illustrating a first sequence change;

FIG. 7B is a diagram illustrating a second sequence change; and

DETAILED DESCRIPTION

Figures 2C, 3:
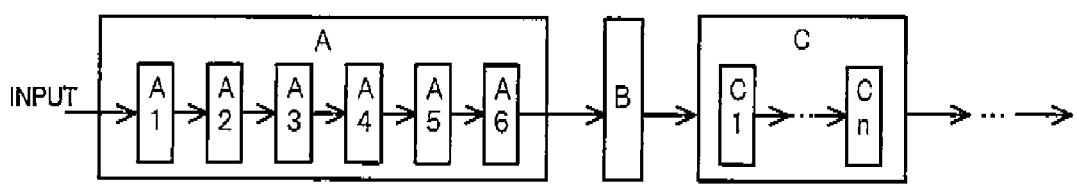
FIG. 2C is a diagram illustrating details represented by values stored in matrix elements of the entire correspondence matrix.
FIG. 3 is a diagram illustrating an example where a pipeline is divided.

Hereinafter, embodiments (hereinafter, referred to as "exemplary embodiments") suitable for carrying out the invention will be described with reference to the accompanying drawings.

FIG. 1 is a functional block diagram illustrating a configuration of an information processing device 10 according to an exemplary embodiment of the invention. As shown in FIG. 1, the information processing device 10 includes an input unit 12, a memory unit 14, a control unit 16, a processing module group storage unit 18, a correspondence information storage unit 20, a partial pipeline extracting unit 22, a partial correspondence information generating unit 24, a partial correspondence information updating unit 26, and a pipeline reconstructing unit 28. The functions of the above-mentioned units may be embodied by allowing a computer having a control part such as a CPU, a memory part such as a memory, and an input and output part for transmitting and receiving data to and from an external device to read and execute a program stored in a computer-readable information recording medium. The program may be provided to the information processing device 10 as a computer using an information recording medium or may be provided thereto through a data communication network such as the Internet.

The input unit 12 receives an input from an input device such as a keyboard or a mouse or an input of data from an external device such as a scanner. In this exemplary embodiment, it is assumed that the input unit 12 receives an input of an image acquired by a scanner.

The memory unit 14 includes a memory device such as a semiconductor memory or a magnetic disk, stores the programs for embodying the functions of the units of the information processing device 10 according to this exemplary embodiment, and is also used as a work area of the control unit 16.

The control unit 16 includes a CPU (Central Processing Unit), operates in accordance with a control program stored in the memory unit 14, and controls the units of the information processing device 10. In this exemplary embodiment, an image received by the input unit 12 and a designated pipeline (a processing module group in which processing modules are connected) for processing the image are input to the control unit 16. As described later, the information processing device 10 according to this exemplary embodiment has a function of efficiently reconstructing the designated pipeline.

The processing module group storage unit 18 includes a memory part such as a semiconductor memory, a magnetic disk, and an information recording medium and stores information on the processing modules included in the entire set of processing modules. The information on the processing modules includes attributes of information (input image information) input to and attributes of information (output image information) output from the processing modules, functions (methods) carrying out the functions of the processing modules, and a function for calculating an amount of data changed between the input information and the output information. The function of calculating an amount of data changed is a function of calculating a ratio of the amount of information output from a processing module to the amount of information input to the processing module.

The correspondence information storage unit 20 includes a memory part such as a semiconductor memory, a magnetic disk, and an information recording medium and stores correspondence information (hereinafter, referred to as "entire correspondence information") on the incorporating of the processing modules or the changing of the processing sequence in each set of processing modules, which can be incorporated or changed in processing sequence, out of the processing modules included in the entire set of processing modules.

FIG. 2A shows an example of the entire correspondence information stored in the correspondence information storage unit 20. As shown in FIG. 2A, the entire correspondence information is a matrix (entire correspondence matrix) in which first processing modules (P1) are located as row elements, second processing modules (P2) are located as column elements, and the possibility of incorporation of the first processing modules and the second processing modules or the effect of change in processing sequence of the first processing modules and the second processing modules are represented by values of the matrix elements. The entire correspondence matrix shows relations between N (N=26 in the drawing) processing modules M1 to MN and is expressed as a N×N matrix.

In FIG. 2A, it is assumed that the relations in which P1 and P2 are carried out in this order are stored in the matrix elements. In the entire correspondence matrix shown in FIG. 2A, it is assumed that the input image is a color image and the effect of change in processing sequence is evaluated on the basis of the processing speed. The entire correspondence matrixes may be generated on the basis of the attribute of the input image and the criterion for evaluating the effect, respectively. FIG. 2B specifically shows the details of the processing modules M1 to M26 in this exemplary embodiment.

FIG. 2C shows the details of the values stored in the matrix elements of the entire correspondence matrix. In FIG. 2C, two examples are shown which include an example where the processing speed is used as the criterion of evaluation and an example where the image quality is used as the criterion of evaluation, but other criterions of evaluation may be used.

When the processing speed is used as the criterion of evaluation, "−2" states that P1 and P2 has a relation of "fixing the processing sequence", "−1" states that the processing speed in the sequence of P1 and P2 is "slower" than that in the inversed sequence, "0" states that the processing speed is "constant" when the processing sequence of P1 and P2 is changed, "1" states that the processing speed in the sequence of P1 and P2 is "faster" than that in the inversed sequence, and "2" states that the processing speed in the sequence of P1 and P2 "depends on the amount of information to be processed." "3" states that P1 and P2 "can be incorporated."

When the image quality is used as the criterion of evaluation, "−2" states that P1 and P2 has a relation of "fixing the processing sequence", "−1" states that the image quality in the sequence of P1 and P2 is "worse" than that in the inversed sequence, "0" states that the image quality is "constant" when the processing sequence of P1 and P2 is changed, "1" states that the image quality in the sequence of P1 and P2 is "better" than that in the inversed sequence, "3" states that P1 and P2 "can be incorporated."

As shown in FIG. 2A, in the entire correspondence matrix generated using the processing speed as the criterion of evaluation, the diagonal elements are substantially "3" because of the relation between the same processing modules, "0" and "2" are respectively stored in a matrix element (j, i) when "0" and "2" are stored in the matrix element (i, j), and "−1" and "1" are respectively stored in a matrix element (j, i) when "1" and "−1" are stored in the matrix element (i, j).

The partial pipeline extracting unit 22 serves to extract a partial pipeline (target processing element group) to be optimized out of the pipeline designated by the control unit 16. In this exemplary embodiment, the partial pipeline extracting unit 22 specifies a processing module (hereinafter, referred to as "fixed processing module") not included in the entire correspondence matrix out of the processing modules included in the designated pipeline and divides the pipeline with respect to the specified fixed processing module. The partial pipeline extracting unit 22 extracts the partial pipelines divided to exclude the fixed processing module as the target to be optimized.

FIG. 3 shows an example where the designated pipeline is divided on the basis of the fixed processing module. Processing module B is a fixed processing module not included in the entire correspondence matrix, the designated pipeline is divided into partial pipeline A including processing modules A1 to A6 and partial pipeline C including processing modules C1 to Cn with respect to processing module B, and the partial pipelines are extracted as the target to be optimized by the partial pipeline extracting unit 22. In the example, it is assumed that A1 has a function of reduction by a half (scale), A2 has a function of inverting pixel values (not), A3 has a function of converting a color space (Color Space), A4 has a function of inverting pixel values (not), A5 has a function of enlargement by three times (scale), and A6 has a function of conversion about the X axis (Mirror X).

The partial correspondence information generating unit 24 extracts data in the entire correspondence matrix which corresponds to the processing modules included in each partial pipeline extracted by the partial pipeline extracting unit 22 and generates partial correspondence matrixes. The process of generating a partial correspondence matrix will be described in detail now with reference to partial pipeline A.

FIG. 4 shows a partial correspondence matrix generated by extracting the row elements and the column elements (M20, M11, M10, M11, M20, and M18), corresponding to elements A1 to A6 of partial pipeline A, in the entire correspondence matrix from the entire correspondence matrix. In the extracted and generated partial correspondence matrix, the processing modules in the rows and columns are arranged in the originally designated sequence (in the sequence of A1, A2, . . . , A6).

Then, the partial correspondence information updating unit 26 updates the partial correspondence matrix generated by the partial correspondence information generating unit 24 on the basis of the values stored therein. An example of a process of updating the partial correspondence matrix in the partial correspondence information updating unit 26 will be described in detail now with reference to FIGS. 5 to 7.

First, the partial correspondence information updating unit 26 updates the locations of "2" (depending on the amount of data to be processed) stored in the partial correspondence matrix. FIG. 5 shows an example of the partial correspondence matrix in which the locations of "2" are updated by the partial correspondence information updating unit 26. Specifically, the partial correspondence information updating unit 26 determines the relation between the first processing modules (column) and the second processing modules (row) based on the predetermined criterion of evaluation (the criterion of evaluation based on the processing speed) from "1" (fast), "0" (constant), and "−1" (slow) on the basis of the image data input from the input unit 12 and the function of calculating the amount of changed data of the processing modules stored in the processing module group storage unit 18, and updates the partial correspondence matrix on the basis of the determined values.

The partial correspondence information updating unit 26 determines a set of processing modules to be incorporated on the basis of the values stored in the partial correspondence matrix and updates the partial correspondence matrix on the basis of the determined set of processing modules. In this exemplary embodiment, sequentially noting the i-th (initial value=1) row of the partial correspondence matrix, the partial correspondence information updating unit 26 determines whether "3" is included in the noted row. When "3" is included in the noted row and "−2" is not included up to the column where "3" is stored in the noted row, the processing modules specified by the row and the column are incorporated. It may be determined into which processing module the processing modules are incorporated on the basis of the amounts of processed data output when the incorporation is carried out. When the incorporation is finished or the processing modules to be incorporated do not exist, the same process is repeatedly performed on the next row. The processing module incorporating process performed by the partial correspondence information updating unit 26 will be described in detail now with reference to FIG. 6.

First, the partial correspondence information updating unit 26 notes the first row and specifies the location of "3" included in the row, as shown in (a) of FIG. 6. In the example shown in (a) of FIG. 6, since "3" is stored at the location of row 1 and column 5 and "−2" does not exist previous to column 5 in the first row, it is determined that processing module A1 and processing module A5 should be incorporated. Processing module A1 has a function of reduction by a half, processing module A5 has a function of enlargement by three times, and the incorporated module has a function of enlargement by 1.5 times, whereby the amount of output data is greater than the amount of input data. Accordingly, processing module A1 is incorporated into processing module A5 arranged in the sequent stage. In this exemplary embodiment, the processing modules are incorporated when the processing modules can be incorporated, but a determination part for determining the incorporation may be further provided and the incorporation process may be performed on the basis of the determination result.

The partial correspondence information updating unit 26 deletes the row and column corresponding to processing module A1 from the partial correspondence matrix, as shown in (b) of FIG. 6, by incorporating processing module A1 into processing module A5, and updates the values of the partial correspondence matrix on the basis of the correspondence between the processing modules after the incorporation, as shown in (c) of FIG. 6. In (c) of FIG. 6, since "−2" exists from "3" to the diagonal element, the incorporation process is ended.

The partial correspondence information updating unit 26 determines the processing sequence of the processing modules included in the partial correspondence matrix on the basis of the values stored in the partial correspondence matrix updated in the incorporation process, and updates the partial correspondence matrix on the basis of the determined processing sequence. The sequence determining process performed by the partial correspondence information updating unit 26 will be described in detail now.

The partial correspondence information updating unit 26 notes the correspondence information (hereinafter, referred to as "adjacent correspondence information") between the processing modules adjacent in processing sequence in the partial correspondence matrix and changes the sequence of processing modules until "−1" is not included in the adjacent correspondence information. This process is called first sequence change. The adjacent correspondence information is matrix elements located above the diagonal elements. The first sequence change will be described now with reference to FIG. 7A.

As shown in (a) of FIG. 7A, since the correspondence information of processing module A5 and processing module A6 is "−1" in the adjacent correspondence information, the sequence of processing module A5 and processing module A6 is changed to update the partial correspondence matrix as shown in (b) of FIG. 7A. Since "−1" is not included in the adjacent correspondence information in the updated partial correspondence matrix, the first sequence change is ended.

A second sequence change noting "−2" included in the adjacent correspondence information will be described now with reference to FIG. 7B. First, the values of the matrix elements located on the right side and the right-lower side of "−2" are noted. When the values are "1" or "0" as shown in (a) of FIG. 7B, the process is performed in the sequence of processing modules X2 and X3 and the sequence of X2 and X4 and the sequence of X3 and X4 are desirable, whereby the processing sequence of X2, X3, and X4 is uniquely determined. On the other hand, as shown in (h) of FIG. 7B, when "−1" is stored on the right side and "1" is stored on the right-lower side, the process is performed in the sequence of processing modules X2 and X3 and the sequence of X4 and X2 and the sequence of X3 and X4 are desirable, whereby two processing sequences of X4, X2, and X3 and X2, X3, and X4 can be considered and thus the processing sequence is not uniquely determined. Therefore, in this case, processing module X4 and processing module (X2+X3) are compared in the amount of changed data and the processing module having the smaller amount of changed data is arranged in the previous stage.

The partial correspondence information updating unit 26 performs the above-mentioned updating of the partial correspondence matrix on all the partial pipelines to be optimized.

The pipeline reconstructing unit 28 serves to reconstruct the pipeline on the basis of the partial correspondence matrixes of the partial pipelines updated by the partial correspondence information updating unit 26. Specifically, the pipeline reconstructing unit 28 reads and acquires the processing modules located in a row (or a column) of the partial correspondence matrix from the processing module group storage unit 18, sequentially connects the acquired processing modules in the sequence of rows (or columns) of the partial correspondence matrix to form a partial pipeline, and additionally connects the formed partial pipeline and the fixed processing module to reconstruct the pipeline.

Figure 8:
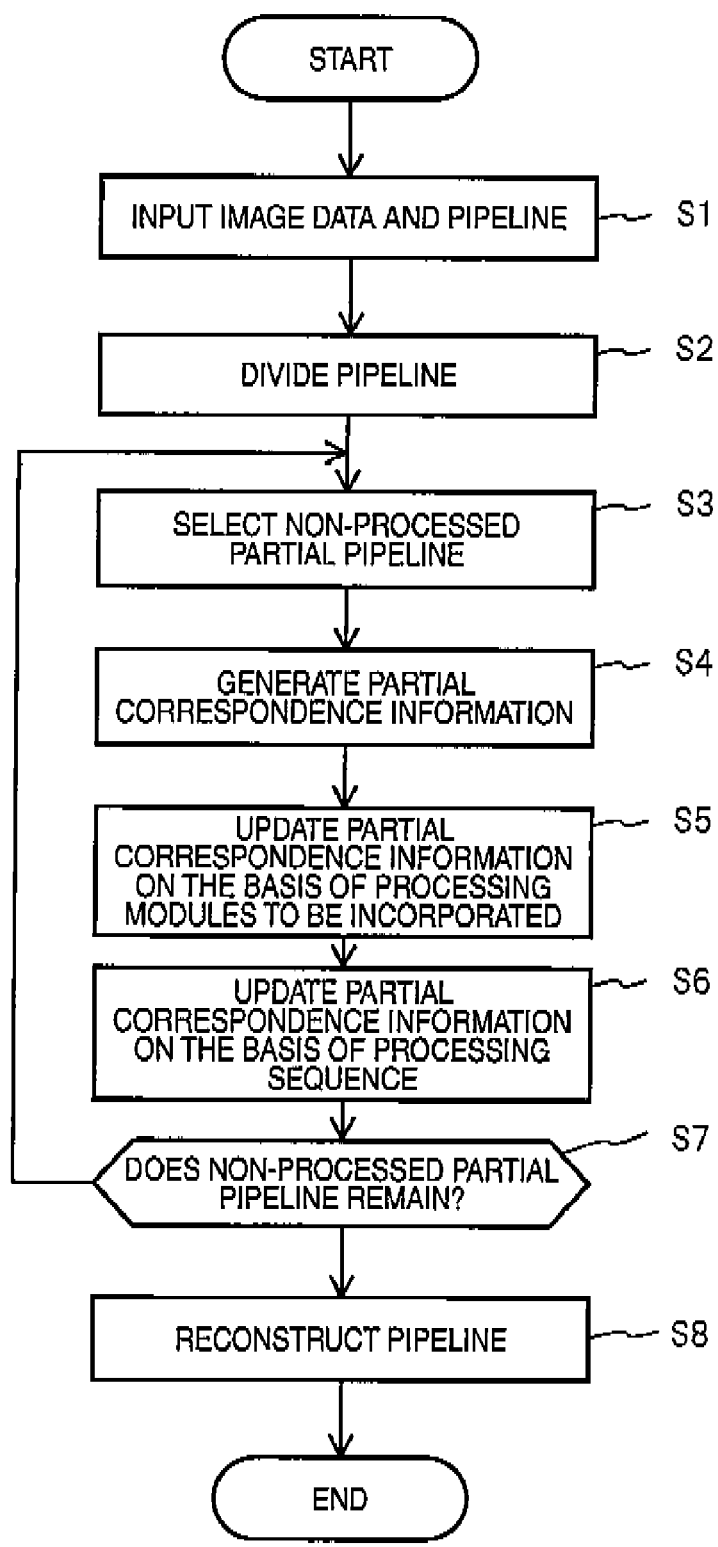
FIG. 8 is a flowchart illustrating a pipeline reconstructing process.

The flow of the pipeline reconstructing process performed by the information processing device 10 will be described now with reference to the flowchart shown in FIG. 8.

The information processing device 10 receives image data and an input of a pipeline (processing path) representing the processing details of the image data (S1). The pipeline is constructed by sequentially connecting plural processing modules. The information processing device 10 divides the input pipeline into one or more partial pipelines on the basis of the entire correspondence information including information on whether the processing modules can be incorporated or can be changed in sequence (S2).

The information processing device 10 selects one non-processed partial pipeline out of the divided partial pipelines (S3) and extracts locations corresponding to the selected partial pipeline from the entire correspondence information to generate partial correspondence information (S4). The information processing device 10 determines the processing modules to be incorporated on the basis of the information on the incorporation of the processing modules, which is information included in the generated partial correspondence information, and updates the partial correspondence information on the basis of the determined processing modules to be incorporated (S5). The information processing device 10 determines the processing sequence of the partial pipeline on the basis of the information included in the updated partial correspondence information and updates the partial correspondence information on the basis of the determined processing sequence (S6).

The information processing device 10 determines whether a non-processed partial pipeline remains (S7), repeatedly performs the process of S3 and the processes subsequent thereto when the determination result is "YES" (Y in S7), acquires the processing modules from the processing module storage unit 18 on the basis of the partial correspondence information of the updated partial pipelines to reconstruct the pipeline (S8) when the determination result is "NO" (N in S7), and then ends the flow of processes.

In the above-mentioned information processing device 10 according to this exemplary embodiment, the process of reconstructing the pipeline into the optimal processing path is carried out with a high efficiency by first performing the incorporation process on the processing module group included in the pipeline and then optimizing the processing sequence. In addition, the processing load is reduced by carrying out the incorporation and the change in sequence of the processing modules using the correspondence information including the information on the incorporation of processing modules or the effect of the processing sequence.

The invention is not limited to the above-mentioned embodiment, but for example, the information processing device 10 may first reconstruct the pipeline and may then subsequently process the image data by the use of the reconstructed pipeline. The invention may be applied to the processing of general data other than the image data.

The foregoing description of the exemplary embodiments of the present invention has been provided for the purpose of illustration and description. It is not intended to be exhaustive or to limit the invention to the precise forms disclosed. Obviously, many modifications and variations will be apparent to practitioners skilled in the art. The exemplary embodiments are chosen and described in order to best explain the principles of the invention and its practical applications, thereby enabling others skilled in the art to understand the invention for various exemplary embodiments and with the various modifications as are suited to the particular use contemplated. It is intended that the scope of the invention be defined by the following claims and their equivalents.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention defined by the following claims and their equivalents.

What is claimed is:

1. An information processing device comprising:
   a storage part that stores correspondence information on incorporation or change in processing sequence of processing elements of each set, the set including processing elements which can be incorporated or changed in processing sequence out of a plurality of processing elements;
   an acquiring part that acquires a target processing element group including a plurality of processing elements;
   an extracting part that extracts the correspondence information, stored in the storage part, on the processing elements included in the target processing element group acquired by the acquiring part;
   an incorporation determining part that determines a set of processing elements to be incorporated from the processing elements included in the target processing element group on the basis of the information on the incorporation of the correspondence information extracted by the extracting part;
   an updating part that updates the processing elements included in the target processing element group and the correspondence information of the processing elements included in the target processing element group on the basis of the set of processing elements determined by the incorporated processing element determining part; and
   a processing sequence determining part that determines the processing sequence of the processing elements included in the target processing element group updated by the updating part on the basis of the information on the change in processing sequence in the correspondence information updated by the updating part.

2. The information processing device according to claim 1, further comprising:
   a processing element storage part that stores the plurality of processing elements; and
   a reconstructing part that reconstructs the target processing element group by acquiring the processing elements included in the target processing element group updated by the updating part from the processing element storage part and connecting the acquired processing elements in the processing sequence determined by the processing sequence determining part.

3. The information processing device according to claim 1, wherein the correspondence information includes information on the possibility of the incorporation of the processing elements of each set or the effect of the change in processing sequence.

4. The information processing device according to claim 2, wherein the correspondence information includes information on the possibility of the incorporation of the processing elements of each set or the effect of the change in processing sequence.

5. The information processing device according to claim 1, further comprising:
   a specifying part that specifies a processing element of which the correspondence information is not stored in the storage part out of the processing elements included in the designated processing element group,
   wherein the acquiring part acquires the processing element groups, which are obtained by dividing the designated processing element group on the basis of the processing element specified by the specifying part, as the target processing element group.

6. The information processing device according to claim 2, further comprising:
a specifying part that specifies a processing element of which the correspondence information is not stored in the storage part out of the processing elements included in the designated processing element group,
wherein the acquiring part acquires the processing element groups, which are obtained by dividing the designated processing element group on the basis of the processing element specified by the specifying part, as the target processing element group.

7. The information processing device according to claim 3, further comprising:
a specifying part that specifies a processing element of which the correspondence information is not stored in the storage part out of the processing elements included in the designated processing element group,
wherein the acquiring part acquires the processing element groups, which are obtained by dividing the designated processing element group on the basis of the processing element specified by the specifying part, as the target processing element group.

8. A non-transitory computer readable medium storing a program causing a computer to execute a process, the process comprising:
referring to a storage part that stores correspondence information on incorporation or change in processing sequence of processing elements of each set, the set including processing elements which can be incorporated or changed in processing sequence out of a plurality of processing elements;
acquiring a target processing element group including a plurality of processing elements;
extracting the correspondence information, stored in the storage part, on the processing elements included in the target processing element group acquired;
determining a set of processing elements to be incorporated from the processing elements included in the target processing element group on the basis of the information on the incorporation of the correspondence information extracted;
updating the processing elements included in the target processing element group and the correspondence information of the processing elements included in the target processing element group on the basis of the set of processing elements determined; and
determining the processing sequence of the processing elements included in the target processing element group updated on the basis of the information on the change in processing sequence in the correspondence information updated.

9. An information processing method comprising:
referring to a storage part that stores correspondence information on incorporation or change in processing sequence of processing elements of each set, the set including processing elements which can be incorporated or changed in processing sequence out of a plurality of processing elements;
acquiring a target processing element group including a plurality of processing elements;
extracting the correspondence information, stored in the storage part, on the processing elements included in the target processing element group acquired;
determining a set of processing elements to be incorporated from the processing elements included in the target processing element group on the basis of the information on the incorporation of the correspondence information extracted;
updating the processing elements included in the target processing element group and the correspondence information of the processing elements included in the target processing element group on the basis of the set of processing elements determined; and
determining the processing sequence of the processing elements included in the target processing element group updated on the basis of the information on the change in processing sequence in the correspondence information updated.

* * * * *